(12) United States Patent
Kela et al.

(10) Patent No.: US 7,130,004 B2
(45) Date of Patent: Oct. 31, 2006

(54) DISPLAY ARRANGEMENT

(75) Inventors: Jukka Kela, Hellerup (DK); Stefan Olsen, Bronshoj (DK); Helle Baarup Lundsgaard, Copenhagen (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/086,737

(22) Filed: Mar. 4, 2002

(65) Prior Publication Data

US 2003/0164918 A1 Sep. 4, 2003

(51) Int. Cl.
*G02F 1/1333* (2006.01)

(52) U.S. Cl. ............................ 349/58; 349/60; 349/150

(58) Field of Classification Search ................. 349/58, 349/60, 16, 14, 150
See application file for complete search history.

(56) References Cited

U.S. PATENT DOCUMENTS

| | | | | |
|---|---|---|---|---|
| 5,659,376 A | * | 8/1997 | Uehara et al. | 349/58 |
| 5,808,707 A | * | 9/1998 | Niibori et al. | 349/58 |
| 5,838,401 A | | 11/1998 | Uehara | |
| 6,064,453 A | * | 5/2000 | Inubushi et al. | 349/58 |
| 6,216,329 B1 | * | 4/2001 | Kaga et al. | 29/458 |
| 6,352,322 B1 | * | 3/2002 | Nakao | 312/223.1 |
| 6,608,664 B1 | * | 8/2003 | Hasegawa | 349/160 |
| 2001/0007485 A1 | | 7/2001 | Kaga et al. | |

FOREIGN PATENT DOCUMENTS

| | | |
|---|---|---|
| EP | 0638832 | 2/1995 |
| EP | 0730185 | 9/1996 |

OTHER PUBLICATIONS

Patent Abstract of Japan, Publ. No. 02093425-Publ. Date Apr. 4, 1990.

* cited by examiner

*Primary Examiner*—Dung T. Nguyen
*Assistant Examiner*—Thoi V. Duong
(74) *Attorney, Agent, or Firm*—Alston & Bird LLP

(57) ABSTRACT

The invention relates to a display arrangement for establishing a flexible mounting of a liquid crystal display (LCD) module in an electronic equipment for minimize the impact on the LCD module of externally applied forces on the electronic equipment, e.g. dropping the electronic equipment. This is managed by having a gap between the LCD and the surrounding mechanics in the electronic equipment. The LCD module is positioned in relation to the surrounding mechanics by provisions of elastic and adhesive members between the LCD module and the surrounding mechanics in the electronic equipment.

18 Claims, 3 Drawing Sheets

DISPLAY ARRANGEMENT

BACKGROUND OF THE INVENTION

1. Field of the Invention

The present invention relates to a display arrangement for holding a liquid crystal display (LCD) in a communication terminal that minimizes the impact of external forces applied on the display arrangement.

2. Description of Prior Art

Display holder arrangements are widely known in different electronic equipment. The display arrangement in electronic equipment aims to firstly hold the display for its intended purpose, but also secondly protects the display from the impact from any external forces applied on the electronic equipment. The second purpose of protecting the display is of particular importance for portable devices that easily can be dropped and that are handled less carefully.

Communication terminals, like mobile phones, have the disadvantage that they can not be rigid enough to easily resist external forces, as they would be too clumsy for the normal user. Only specially designed phones, like Nokia 6250™, have this very rigid design. In other phones or electronic equipment the display arrangement is designed to prevent impact on the displays by a flexible or adjustable mounting. More precisely the earlier implementations of display arrangements in communication terminals were constructed so that the LCD module was supported by the sidewalls or placed towards the sidewalls, and held in its position by the surrounding mechanics, that were applied directly on the LCD module. This caused significant problems with cracking displays after the communication terminal accidentally had been dropped.

An example of earlier solutions is described in the prior art document GB 2190529 A. In GB 2190529 A a liquid crystal display (LCD) mounted on a printed circuit board is described. The LCD is mounted behind an opening with the edges serving as a bezel for the LCD. A resilient gasket extends around the periphery of the LCD and is positioned between the LCD and the bezel to prevent movement of the LCD relative to the housing. Other examples of display arrangement are described in EP 0939 532 A2, EP 0709714 B1 and FR 2674295 A1, all of which describe a solution having the display rigidly positioned in a housing and with the display not being flexible.

SUMMARY OF THE INVENTION

The present invention provides a display arrangement that is flexible with a liquid crystal display (LCD) module which resists externally applied forces to the display arrangement.

According to a first preferred embodiment of the claimed invention a display arrangement has a gap between the LCD module and the surrounding mechanics with flexible material being used to retain the relative position of the LCD module to the surrounding mechanics.

The invention is also a method for arranging a LCD in relation to a housing to enable a flexible display to adjust to externally applied forces to a display arrangement to minimize the risk cracking of the LCD.

A preferred embodiment of the invention is a method for establishing a flexible display arrangement, where a liquid crystal display (LCD) is attached to a housing by an adhesive member along the periphery of the bottom surface of the LCD, having a cavity between the side walls of the housing and the side periphery of the LCD, and further applying an elastic member between the top surface of the LCD and the housing.

The invention also is a method for mounting a display module in a display arrangement so that the LCD retains a relative position to the rest of the display arrangement.

A preferred embodiment of the invention is a method for arranging a LCD in relation to a housing in an electronic equipment comprising the steps of applying an adhesive member along the periphery of the bottom surface of the LCD and attaching the LCD to a first housing part, mounting a second housing part including a elastic member on the first member, as to enable the elastic member to establishing a pressure on the LCD, and retaining a relative position between the LCD and the housing parts.

BRIEF DESCRIPTION OF THE DRAWING

The invention will be explained more fully below, by way of example, in connection with preferred embodiments and with reference to the drawing, in which.

DETAILED DESCRIPTION OF THE INVENTION

Figure 1:
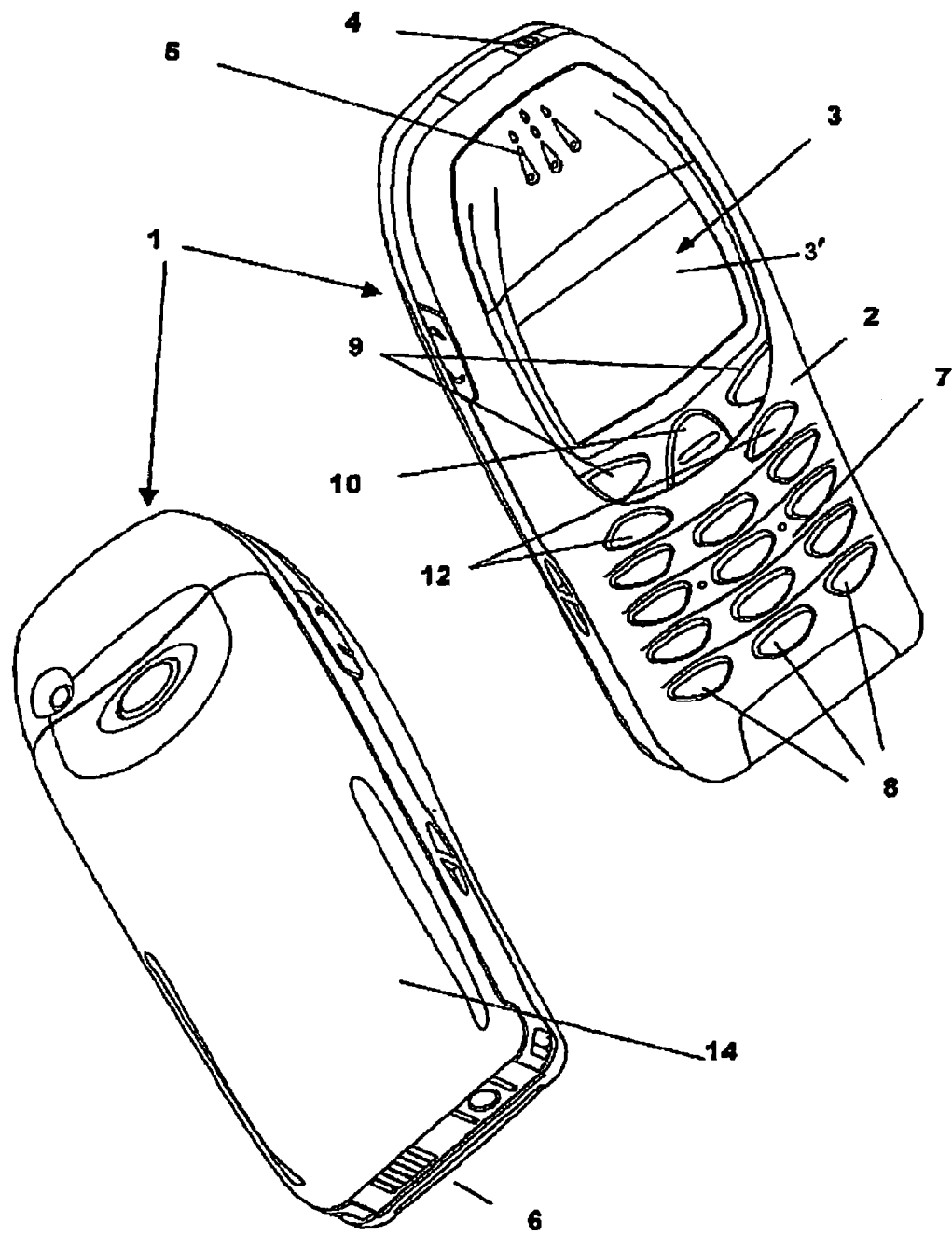
FIG. 1 shows in two different perspective views a known embodiment of a communication terminal.

The display arrangement according to the invention is described with reference to a hand portable phone, preferably a cellular/mobile phone. An embodiment of this phone is shown in FIG. 1, where a cellular/mobile phone 1 is shown in perspective. As will be seen, the phone is provided with a front cover 2 having a window frame encircling the protection window 3' of the display assembly 3. The cellular/mobile phone comprises a user interface having an on/off button 4, a speaker 5 (only openings are shown), a keypad 7, a battery 14, a display/LCD 3 and a microphone 6 (only openings are shown).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0–9" or a sign "#" or "*", respectively. In alpha mode each key is associated with a number of letters and special signs used in the text editing.

The keypad 7 additionally comprises two menu selections or soft-keys 9, two call handling keys 12, and a navigation-key 10. The function of the soft-key depends on the state of the phone and the navigation in the menu by using a navigation-key. The present function of the menu selection keys 9 is shown in separate fields in the display 3 just above the keys 9. The two call handling keys 12 are used for establishing a call or a conference call, terminating a call or rejecting an incoming call. This key layout is characteristic of e.g. the Nokia 6210™ phone.

The navigation-key 10 is an up/down key and is placed centrally on the front surface of the phone between the display 3 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 2:
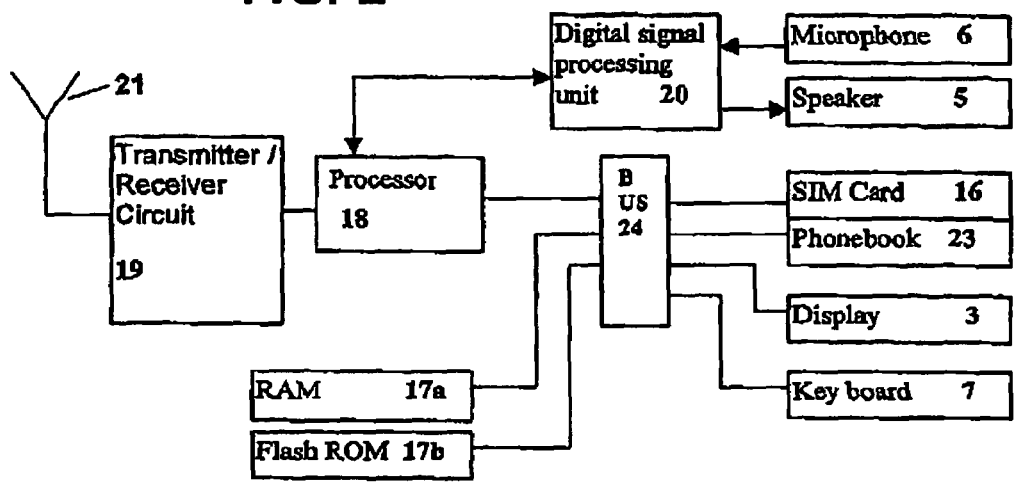
FIG. 2 schematically shows the essential parts of a telephone for communication with a cellular network.

FIG. 2 schematically shows the most important parts of a preferred embodiment of the phone/terminal, which are essential to the understanding of the invention. The microphone 6 records the user's speech, and the analog signals formed thereby are A/D converted in an A/D converter (not shown) before the speech is encoded in an audio part 20. The encoded speech signal is transferred to a processor 18 (physical layer processor), which, for example, supports GSM terminal software. The processor 18 also forms the interface to the peripheral terminals of the apparatus, including RAM and ROM memories 17a and 17b, a SIM card 16, the display 3 and the keypad 7 (from FIG. 1) as well as data, power supply, etc. The processor 18 controls the communication with the network via the transmitter/receiver circuit 19 and an antenna 21. The audio part 20 speech-decodes the signal, which is transferred from the processor 18 to the speaker 5 via a D/A converter (not shown).

The processor 18 is connected via a bus 24 to a RAM memory 17a and a Flash ROM memory 17b, a SIM card 16, the display 3 and the keypad 7 (as well as data, power supply, etc.). Furthermore a phonebook 23 is connected to the processor 18 via the bus 24. The phonebook 23 may be stored on the SIM card 16, and/or in the Flash ROM memory 17a.

Figure 3:
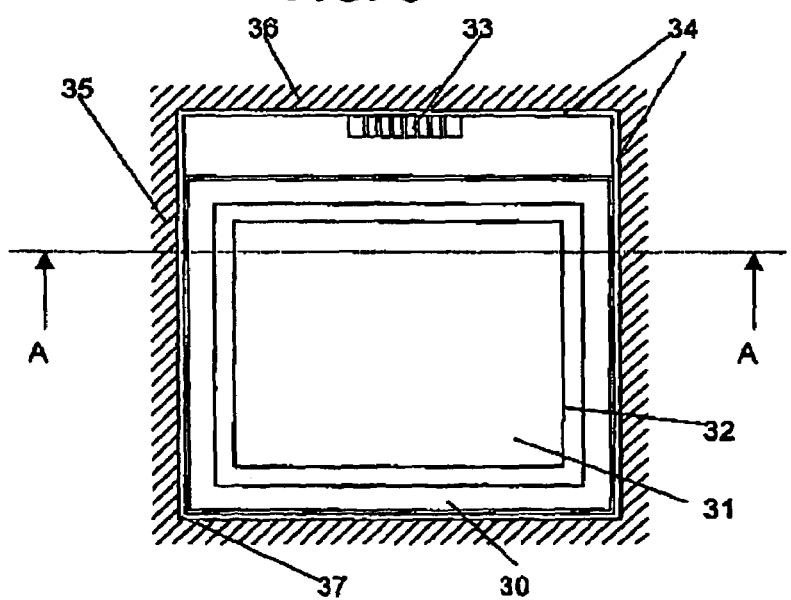
FIG. 3 shows a display arrangement and the topside of a liquid crystal display module in the display arrangement.

FIG. 3 schematically shows a display arrangement according to a first embodiment of the claimed invention. A display module 30 includes a liquid crystal display (LCD) 31 having a frame 32, connector pads 33 and lines (not shown) connecting the LCD 31 to the connector pads 33. The connection between the connector pads 33 and the printed circuit board has been left out from FIG. 3 to simplify it. All the way around the LCD module 30 is an air gap or cavity 34, and outside the gap or cavity is located a light guide 35, wherein the LCD module has been disposed.

Figure 4:
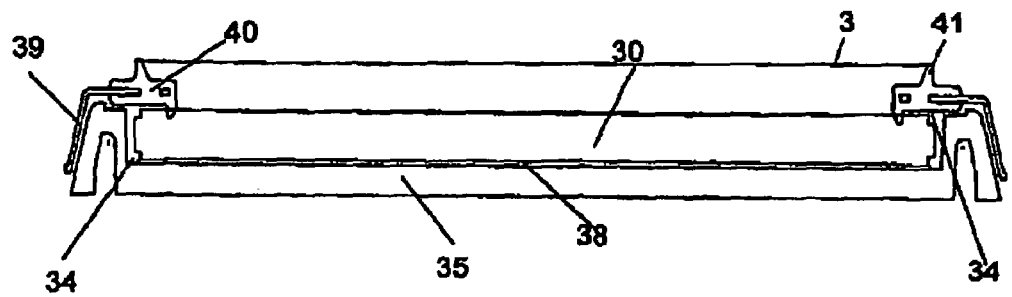
FIG. 4 shows a cross section of the display arrangement according to the invention.

The exact design of the remainder of the lightguide is not a part of the invention, but is substantially similar to lightguides used in e.g. Nokia 6210™, 3310™, 3330™ or 6510™. The hatched section 36 around the inner periphery 37 of the lightguide 35 symbolizes the remainder of the lightguide 35. The reference A—A in FIG. 3 is shown as a cross section in FIG. 4. The cross section of the lightguide 35 is more clear than the LCD module 30. The air gap or cavity 34 around the LCD module 30 is also shown together with an air gap or cavity 38 between the bottom surface of the LCD module 30 and the lightguide 35. Further included is a metal frame 39 that is placed on top of the lightguide 35 to hold the LCD module 30 is position. The metal frame has been provided with an elastic gasket 40 along the inner periphery thereof to establish a flexible pressure on the topside of the LCD module 30. The flexible pressure enables the LCD module 30 to adjust to externally applied forces on the display arrangement that otherwise might cause cracks under the externally applied forces.

The metal frame 39 can be held in position by clips (not shown), snapping provisions or be provided with cut outs wherein welded plastic from the lightguide can project therein and thereby holding the metal frame in position. The metal frame 39 can cover over parts other than the display arrangement that surrounds the display arrangement.

Figure 5:
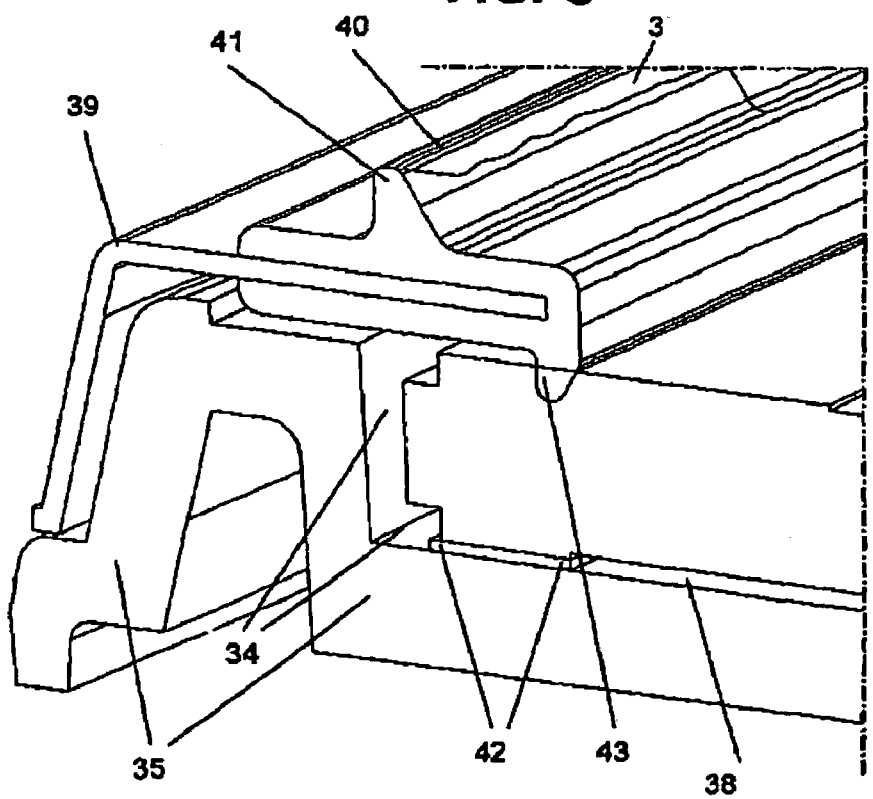
FIG. 5 shows a part of a detailed cross section of the display arrangement according to the invention.

In FIG. 5 is shown an enlarged part of the display arrangement including the lightguide 35, the LCD module 30, the metal frame 39 and the elastic gasket 40. It also shows an adhesive member 42 that has been applied along the periphery of the bottom surface of the LCD module 30. Outside and inside the adhesive 42 is respectively an air gap 34 and an air gap 38 located between the LCD module 30 and the lightguide 35. The adhesive 42 has elastic properties to enables absorption of externally applied forces which are similar to the properties of the elastic gasket 40. The absorption of externally applied forces minimizes the impact on the LCD module 30 and risk of the LCD 31 craking in response to the externally applied forces.

The end 43 of the elastic gasket 40 appears to enter into the LCD module 30, but this illustration is made only to show that the elastic gasket end 43 compresses to some degree in order to apply a holding pressure to the LCD module 30.

The elastic gasket 40 is further provided with a flange 41 that serves as dust protection for the LCD module 30 and the protection window 3' on a front cover 2. It does not need to be a lightguide that surrounds the LCD module, but can be any kind of surrounding mechanics or fixture, as long as there is an air gap or cavity around the LCD module. The lightguide can be replaced by an illuminating foil or other provisions that can supply the LCD module with light for illumination.

The invention is not limited to the above-described examples or to the drawings showing examples of an embodiment, but can be varied within the scope of the appended claims.

What is claimed is:

1. A display arrangement including a liquid crystal display comprising a protective window which covers the liquid crystal display to provide protection thereof and the arrangement holding the liquid crystal display in a position relative to a housing including first and second housing parts comprising:
   an elastic part located between the liquid crystal display and the second housing part, contacting the first housing part and including a portion which contacts an under surface of the protective window to seal a space between a top of the liquid crystal display and the under surface, a cavity located between a periphery of the liquid crystal display and the first housing part, and an adhesive member applied along a periphery of a bottom surface of the liquid crystal display which attaches the liquid crystal display to the housing; and wherein
   the first housing part covers the periphery and the bottom surface of the liquid crystal display and the second housing part covers a periphery of a top surface of the liquid crystal display.

2. A display arrangement according to claim 1 wherein:
   the elastic part is flexible and is located on the second housing part to provide pressure on the liquid crystal display and provide a dust-proof seal between the protective window of the liquid crystal display and the housing.

3. A display arrangement according to claim 2 comprising:
   a side connector to a printed circuit board located on a side of the liquid crystal display.

4. A communication terminal, comprising:
   a display arrangement according to claim 3.

5. A communication terminal, comprising:
   a display arrangement according to claim 2.

6. A display arrangement in accordance with claim 2 wherein the elastic part contacts the second housing part.

7. A communication terminal, comprising:
a display arrangement according to claim 6.

8. A display arrangement according to claim 1 comprising:
- a side connector to a printed circuit board located on a side of the liquid crystal display.

9. A communication terminal, comprising:
a display arrangement according to claim 8.

10. A communication terminal, comprising:
a display arrangement according to claim 1.

11. A display arrangement in accordance with claim 1 wherein the elastic part contacts the second housing part.

12. A communication terminal, comprising:
a display arrangement according to claim 11.

13. A method for arranging a liquid crystal display including a protective window which covers the liquid crystal display to provide protection thereof in relation to a housing including first and second housing parts in an electronic equipment comprising:
- applying an adhesive member along a periphery of a bottom surface of the liquid crystal display and attaching the liquid crystal display with the adhesive member to the first housing part, mounting the second housing part to cover a periphery of a top surface of the liquid crystal display with an elastic member located between the second part and a top surface of the liquid crystal display, the elastic member contacting the first housing part and including a portion which contacts an under surface of the protective window to seal a space between a top of the liquid crystal display and the under surface and wherein the elastic member establishes a pressure on the top surface of the liquid crystal display which retains the relative position between the liquid crystal display and the housing parts.

14. A method in accordance with claim 13 wherein the elastic member contacts the second housing part.

15. A method for establishing a flexible display arrangement, comprising:
- attaching a liquid crystal display, including a protective window which covers the liquid crystal display to provide protection thereof, to a housing including first and second housing parts wherein the first housing part covers a periphery of the liquid crystal display and a bottom surface of the liquid crystal display and the second housing part covers a periphery of a top surface of the liquid crystal display with an adhesive member located along a periphery of the bottom surface of the liquid crystal display and attaching the liquid crystal display with the adhesive member to the first housing part with the housing including a cavity located between side walls of the housing and a side periphery of the liquid crystal display; and
- applying an elastic member between a top surface of the liquid crystal display and the second part of the housing, the elastic member contacting the first housing part and including a portion which contacts an under surface of the protective window to seal a space between a top of the liquid crystal display and the under surface.

16. A method according to claim 15 wherein:
the liquid crystal display is attached to a first housing part with the adhesive member, and the second housing part and the elastic member surrounds an inner periphery of the second housing part with the elastic member applying a retaining force on a top surface of the liquid crystal display.

17. A method in accordance with claim 16 wherein the elastic member contacts the second housing part.

18. A method in accordance with claim 15 wherein the elastic member contacts the second housing part.

* * * * *

UNITED STATES PATENT AND TRADEMARK OFFICE
CERTIFICATE OF CORRECTION

| | | |
|---|---|---|
| PATENT NO. | : 7,130,004 B2 | Page 1 of 1 |
| APPLICATION NO. | : 10/086737 | |
| DATED | : October 31, 2006 | |
| INVENTOR(S) | : Kela et al. | |

It is certified that error appears in the above-identified patent and that said Letters Patent is hereby corrected as shown below:

Column 4,
Line 40, in claim 1, after "part" insert,
--, surrounding an inner periphery of the second housing part,--.

Column 5,
Line 27, in claim 13, after "display," insert,
--the elastic member surrounding an inner periphery of the second housing part,--.

Column 6,
Line 26, in claim 16, after "member, and", cancel "the second housing part and the elastic member surrounds an inner periphery of the second housing part with";
Line 28, "applying" should read --applies--.

Signed and Sealed this

Thirteenth Day of March, 2007

JON W. DUDAS
*Director of the United States Patent and Trademark Office*